United States Patent Office 3,115,072
Patented Dec. 24, 1963

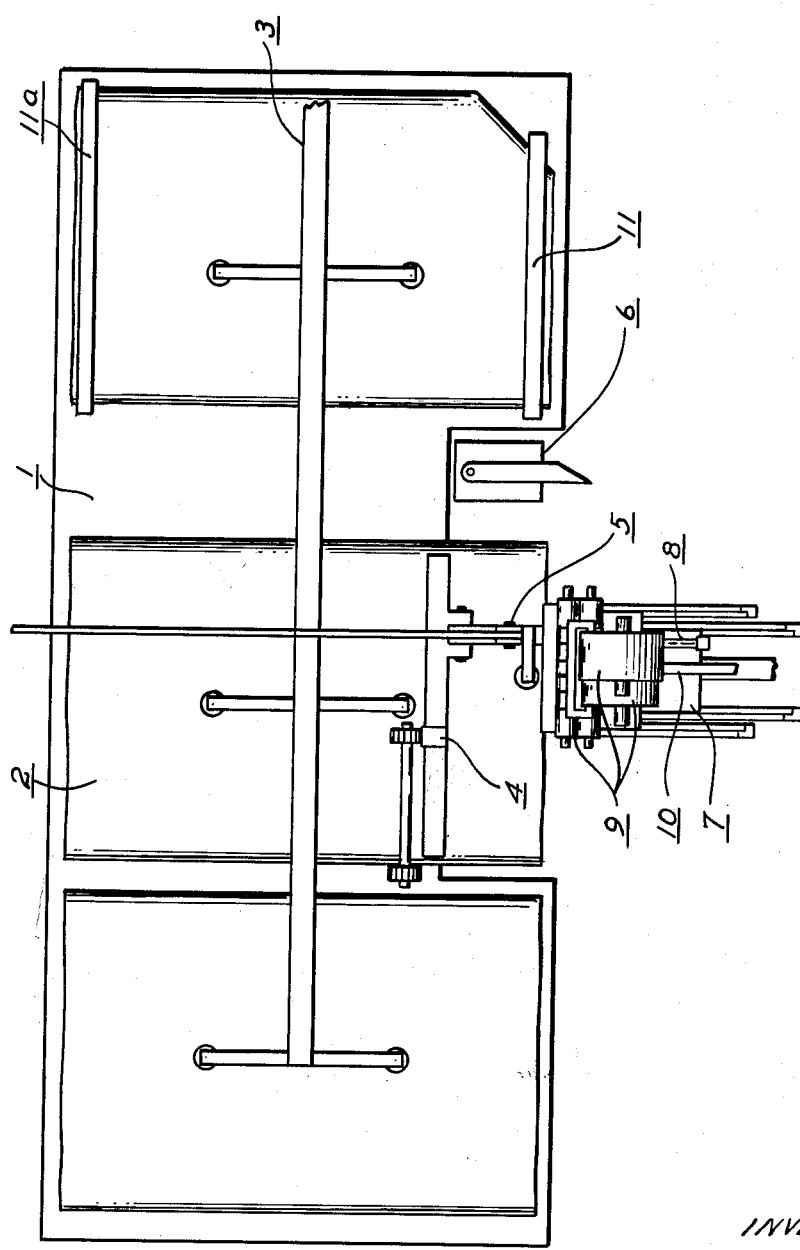

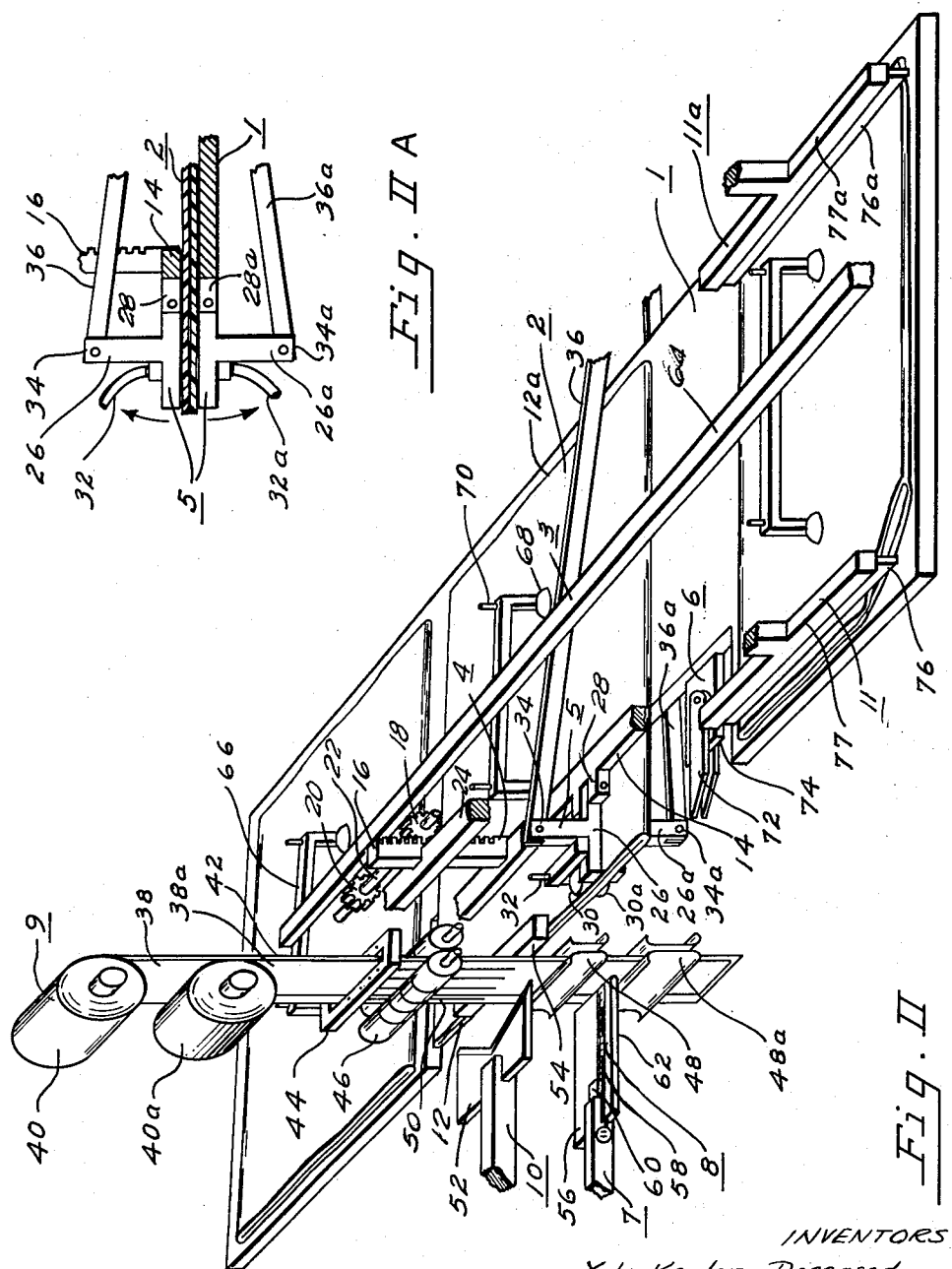

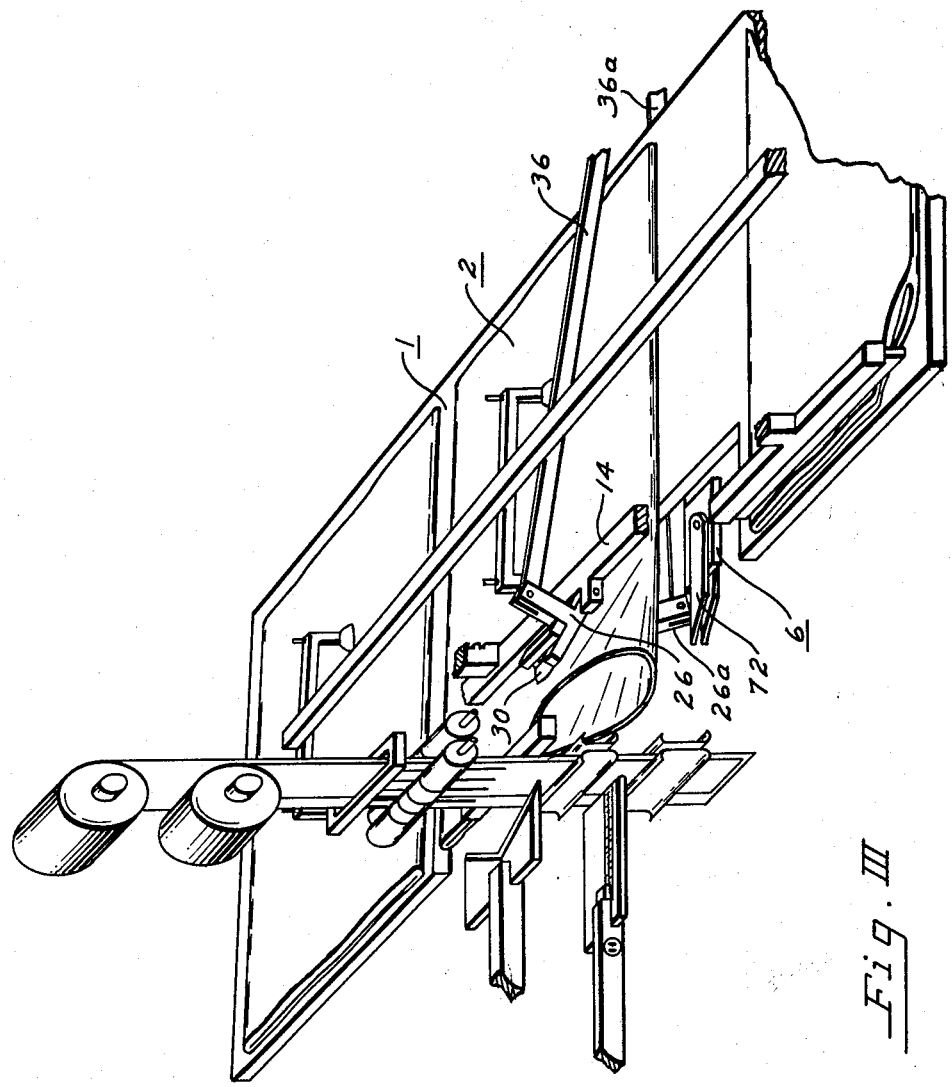

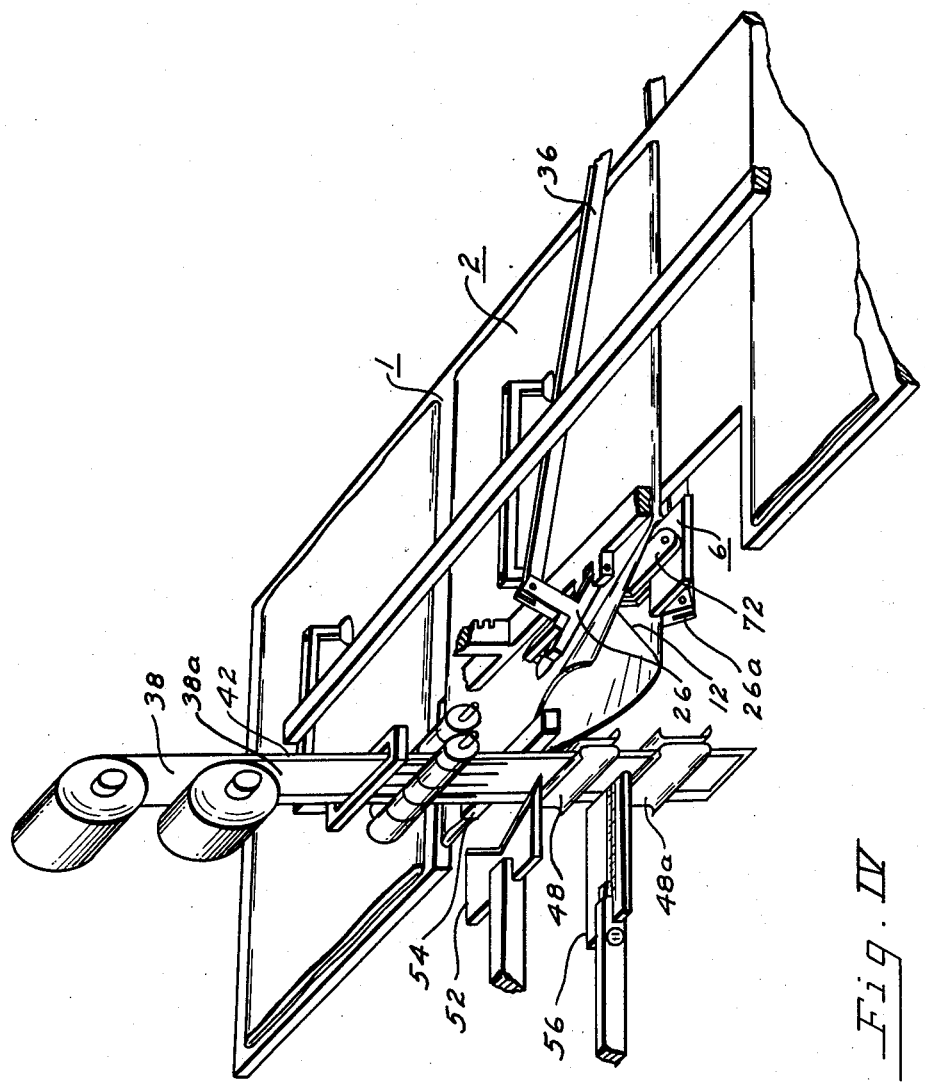

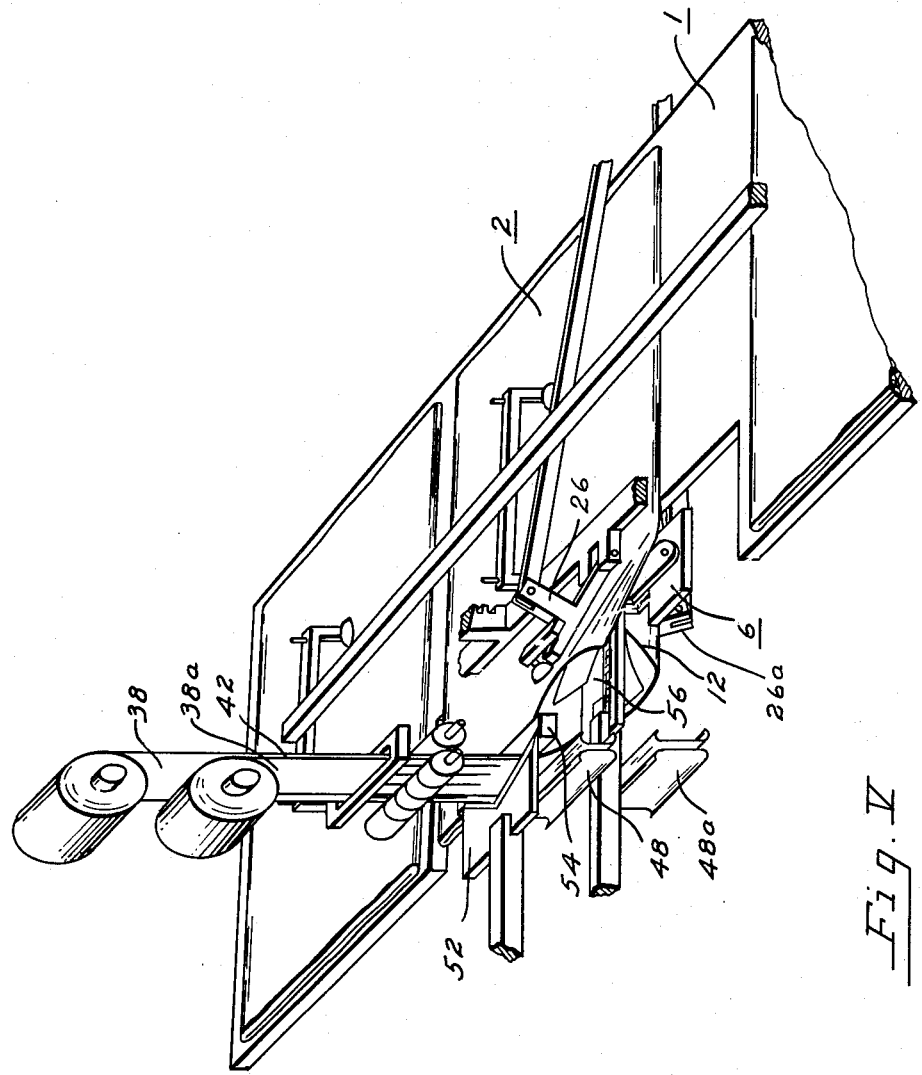

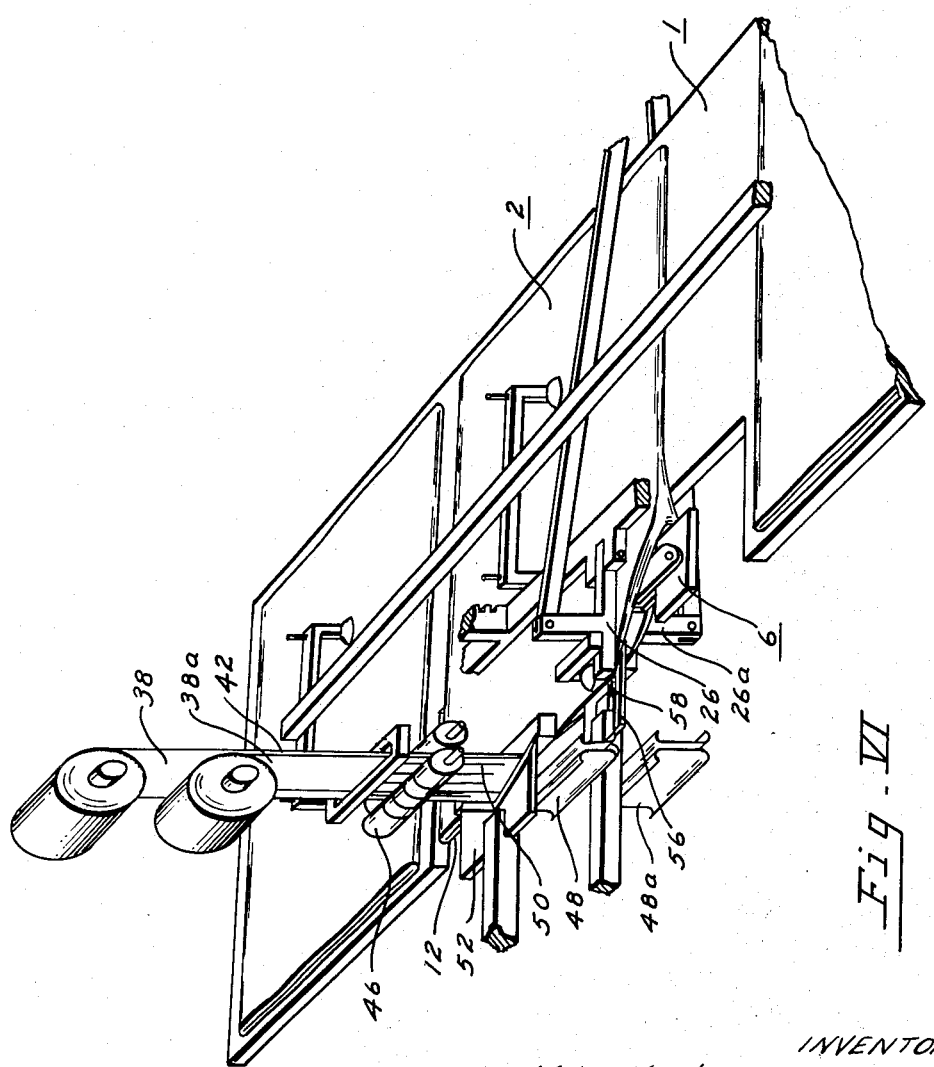

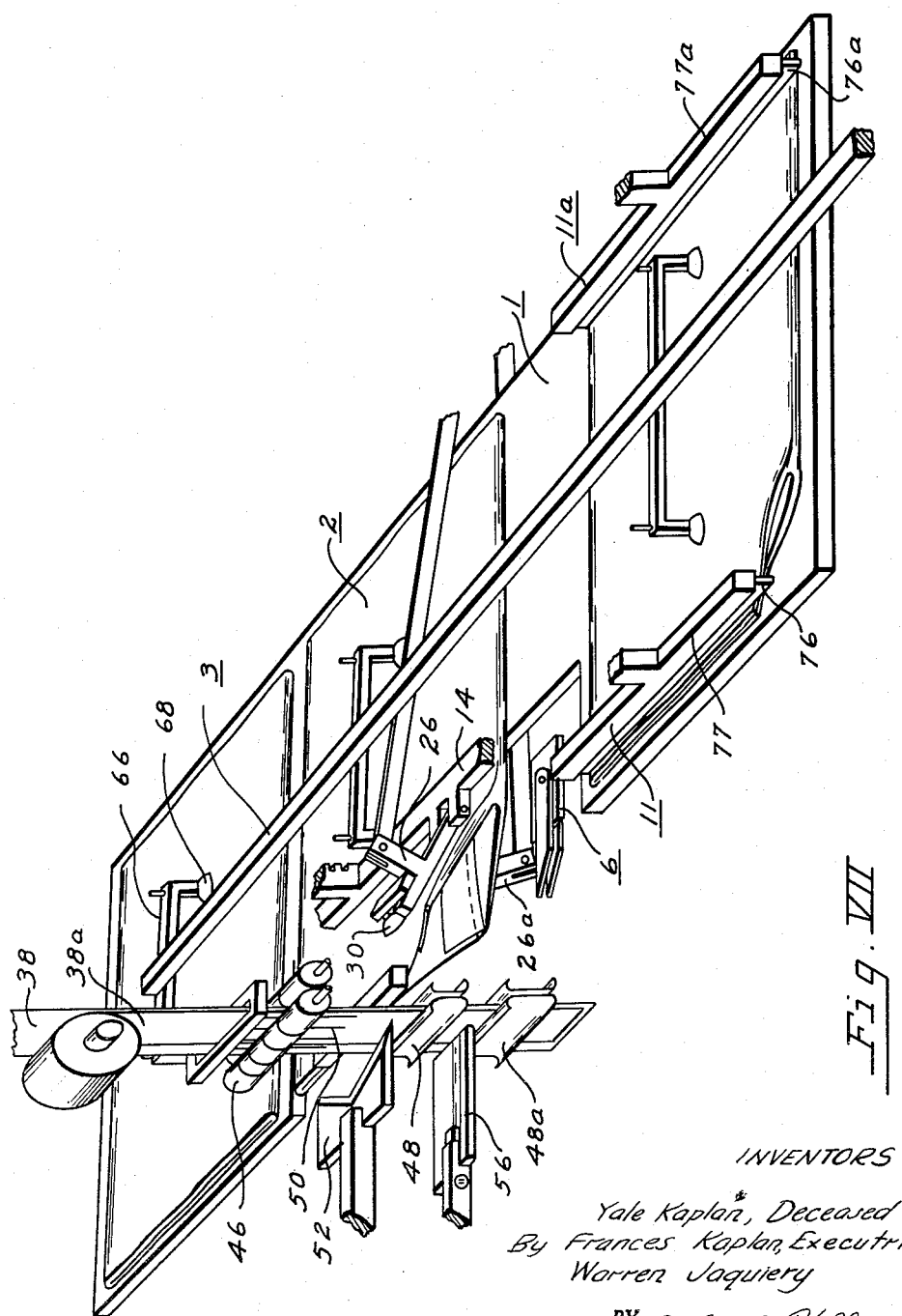

3,115,072
BAG FORMING AND SEALING MACHINE
Yale Kaplan, deceased, late of West Hartford, Conn., by Frances Kaplan, executrix, West Hartford, Conn., and Warren Jaquiery, Watertown, Conn., assignors to Monsanto Chemical Company, St. Louis, Mo., a corporation of Delaware
Filed June 2, 1961, Ser. No. 114,559
7 Claims. (Cl. 93—8)

The present invention relates to bags and more particularly to valved bags formed of thermoplastic materials.

This application is a continuation in part of the now abandoned application S.N. 29,093, filed May 13, 1960.

Valve bags of the present type are generally known and are presently in use. They can be formed of paper, cloth, various polymeric materials and the like. While problems arise in the manufacture of bags using different materials, there are peculiar and aggravated problems in producing those formed from thermoplastic materials. In particular, the major problem has been to obtain adequate sealing of the valve member or members to a plastic bag blank at an economically feasible rate.

Accordingly, it is a primary object of this invention to provide apparatus means by which the sleeved valve may be effectively and expeditiously formed and sealed to a bag blank, both the valve and the bag blank being constituted of flexible thermoplastic materials.

Another object of this invention is to provide apparatus means by which a sleeved valved bag may be expeditiously formed and sealed, the sleeved valved bag being constituted of flexible thermoplastic materials.

Other objects of the present invention will be apparent from the following specification and the accompanying drawings, in which:

FIG. I is a plan view of the top of the apparatus showing the bag blank conveying table and valve forming means;

FIG. II is a perspective view of the apparatus showing the bag blank conveying table and valve forming means with a plastic bag blank in place just prior to forming the sleeved valve;

FIG. IIA is an enlarged elevational side view of the clamping members shown in FIG. II showing the plastic bag blank interposed between the upper and lower clamping members;

FIG. III is another perspective view of the apparatus showing the bag blank conveying table and valve forming means and the plastic bag blank, i.e., a flattened tube of flexible thermoplastic sheet material, opened at one end preparatory to forming the valve;

FIG. IV is a third perspective view of the apparatus showing the plastic bag blank partially folded in at one corner by the corner folding member;

FIG. V is a fourth perspective view of the apparatus showing the plastic bag blank completely folded in at one corner and the partial insertion or threading of the thermoplastic sleeve sheeting into the folded corner of the plastic bag blank by the threading means;

FIG. VI is a fifth perspective view of the apparatus showing the thermoplastic sleeve sheeting being heat sealed to the leading edge of the inverted corner of the plastic bag blank;

FIG. VII is a sixth perspective view of the apparatus showing completion of the sleeve sheeting seal of the plastic bag blank preparatory to conveying the plastic bag blank along the table to the end.

Referring to the drawings, and more specifically, to FIG. I showing a top plan view of an apparatus designed to provide a sleeve valve in thermally sealed relationship at a corner of a plastic bag blank consisting of, in combination, a planar support means 1 for the plastic bag blank 2, a conveying means 3 for positioning the plastic bag blank 2 on the planar support means 1, holding means 4 for securing the plastic bag blank 2 in place, clamping means 5 for separating the interior surfaces of the plastic bag blank 2, a corner folding member 6 in substantially longitudinal planar relationship and pivotally actionable relative to said planar support 1, for indenting and imparting an inverted corner fold to the plastic bag blank 2, threading means 7 reciprocally actionable in lateral planar relationship to said planar support 1, provided with a valve heat sealing element 8 for inserting sheets of flexible thermoplastic material in folded relationship relative to itself between the separated interior surfaces of the plastic bag blank 2 and in part laterally overlapping the leading edge of the now inverted corner of said plastic bag blank 2 and heat sealing said folded sheets to the interior surfaces of the corner folds of the plastic bag blank 2, said threading means and heat sealing element being capable of longitudinal positioning corresponding at least in part to that part of said folded sheets which overlays the inverted corner of the plastic bag blank 2, a continuous sheet supply means 9, as seen from the top, coordinated with the said threading means 7, a cutting member 10, coordinated with the threading means 7 and continuous sheet supply means 9, for sizing and feeding sheets of thermoplastic material to the threading means 7, and end sealing means 11 and 11a adapted for sealing the open lateral ends of the plastic bag blank 2.

Referring more in detail to the figures of the drawings and more specifically to FIGS. II to VI, the successive steps required to make the valved bag shown and described herein are illustrated.

Referring to FIG. II, 2 is a plastic bag blank open at lateral edges 12 and 12a. Holding means 4 comprises bar clamp 14 actuated through rack 16 and pinion gear 18 and is shown in its lowermost position anchoring the bag blank 2 firmly to the planar support means 1 herein referred to as conveying table 1. Bar clamp 14 is fixed to rack 16 and is raised or lowered by the rotation of pinion gear 18 which is driven by gear 20 through a common shaft 22. Gear 20 is rotated clockwise and counterclockwise by motor means not shown. Also, framework 24 which serves to support bar clamp 14, rack 16, pinion gear 18 and gear 20 is not shown completely, for purposes of illustration.

Clamping means 5 comprises top and bottom clamping members 26 and 26a respectively. As the conveying table 1 partially hides the clamping means 5, a side view of the clamping members, FIG. IIA, has been included to further illustrate this part of the present invention. Top clamping member 26, shown in FIG. II, in closed position is attached to bar clamp 14 through pivotal joint 28. A bottom clamping member 26a similar to top clamping member 26, but inverted, is attached to the underside of conveying table 1 through pivotal joint 28a, not shown in FIG. II, opposing the underside of top clamping member 26. Both clamping members are shown more clearly in FIG. IIA with the plastic bag blank 2 interposed between the opposing clamping members 26 and 26a. Suction cups 30 and 30a form a part of clamping members 26 and 26a respectively and serve to grip the top and bottom external surfaces of the plastic bag blank 2 when a suction or negative pressure is applied to suction cups 30 and 30a through tubes 32 and 32a. For more efficient gripping action, the vacuum cups 30 and 30a which are presented each at opposite exterior surfaces of the plastic bag blank 2 should be slightly offset in position relative to one another. Clamping members 26 and 26a open when actuated, respectively, through pivotal joints 34 and 34a by moving connecting rods 36 and 36a, respectively, laterally with respect to conveying table 1, towards the opposite edge 12a of the plastic bag blank 2.

Also shown in FIG. II is the continuous sheet supply means 9. The supporting framework for the continuous sheet supply means 9 is not shown in order to clarify the illustration. Sheet material 38 and 38a are unwound from rolls 40 and 40a respectively, maintaining a common edge 42 and threaded simultaneously down between a wire support rack 44, pull rolls 46, and guiding slots 48 and 48a. Guide wires 50 are suspended and supported by the wire support rack 44 and are suspended between and within the grooves of pull rolls 46.

The cutting member 10, shown in FIG. II, consists of a knife 52 positioned to move laterally towards knife back support bar 54 and is used to sever sheets 38 and 38a.

The threading means 7, shown in FIG. II, comprises a horizontally orientated rigid plate or threading member 56 located directly below knife 52 and positioned to move laterally between guiding slots 48 and 48a towards clamping members 26 and 26a. The valve heat sealing element 8 is located on threading member 56 and consists of an electrical resistance heater element 58 connected at one end to a terminal 60 and at the other end to a second terminal, not shown, located on the underside of threading member 56 directly below terminal 60. The heating element 58 runs from one terminal to the other in a U-shaped fashion across the upper and lower surfaces of threading member 56 in a path parallel to threading member edge 62.

Conveying means 3, shown in FIG. II, consists of conveying shaft 64 located longitudinally to and above conveying table 1 with conveying arms 66 attached to conveying shaft 64, said conveying arms being provided with suction cups 68 and vacuum pressure fittings 70 for gripping each of the top layer surfaces of the plastic bag blanks situated on conveying table 1. Consequently, reciprocating axial movements of conveying shaft 64 serve to transfer plastic bag blanks in stages, from one end of conveying table 1 to the other.

Corner folding member 6, shown in FIG. II, consists of a pivotally actionable trigger blade 72 mounted on a substantially square rigid plate 74 for indenting and imparting an inverted corner fold to the plastic bag blank 2.

End sealing means 11 and 11a, shown in FIG. II, consist of individual heating element strips 76 and 76a mounted in suitable holders 77 and 77a respectively and are positioned for sealing the open lateral ends of the plastic bag blank 2. End sealing means 11 and 11a can be raised and lowered to permit bag blank transfers.

In the valve forming operation, FIG. II shows a plastic bag blank 2 in positon prior to forming the valve. Bar clamp 14 is in its lowermost position firmly pressing the layers of the plastic bag blank 2 against conveying table 1. A negative or suction pressure is applied to the upper and lower suction cups 30 and 30a of clamping members 26 and 26a respectively. As shown in FIG. III, the bag blank 2 is opened by pivotal movements of clamping members 26 and 26a actuated by connecting rods 36 and 36a respectively. After the plastic bag blank 2 is opened, corner folding member 6 moves laterally with respect to conveying table 1, indenting the corner of the bag blank 2. Trigger blade 72 then rotates rapidly forward against the indented corner, completing the inverted corner fold. The completed movements of corner folding member 6 are shown in FIG. IV.

Referring again to FIG. IV, as soon as the inverted corner fold of the bag blank 2 is complete, knife 52 will move laterally toward knife back support bar 54 severing sheets 38 and 38a in its path of travel. Threading member 56 will then move forward, parallel to and in the same direction as knife 52, engaging the midsection of the now severed sheets 38 and 38a between guiding slots 48 and 48a folding and inserting the sheets between the layers of bag blank 2 such that the common edge 42 of the severed sheets 38 and 38a overlaps that portion of edge 12 internal to the inverted corner folds of the plastic bag blank 2. The completed steps described above are shown in FIG. V.

Referring again to FIG. V, when threading member 56 is in its forward position, clamping members 26 and 26a will swing into clamping position pressing the upper and lower corner folds of the plastic bag blank against the sheet inserts covering the top and bottom surfaces of the threading member 56 such that the electrical resistance heater element located on threading member 56 lies parallel and between the common edge 42 of the severed sheet inserts and the overlapping internal corner edge 12 of the plastic bag blank 2. The completed steps described above are shown in FIG. VI.

Referring again to FIG. VI when the seal is completed, the clamping members 26 and 26a will open, threading member 56 and knife 52 will retract while corner folding member 6 moves back to its original position. The completed steps are shown in FIG. VII.

Referring again to FIG. VII, when knife 52 is retracted, additional film sheeting 38 and 38a will then be unwound and fed between the guiding slots 48 and 48a by pull rolls 46. Guide wires 50 serve to impart a slight elongational corrugation to the plural sheeting 38 and 38a reducing sheet flexibility for improved sheet feeding to guiding slot 48.

After completion of all the operations described above, the vacuum pressure applied to the suction cups of 30 and 30a top and bottom clamping members 26 and 26a, respectively, is released and bar clamp 14 is raised. A vacuum is then applied to the suction cups 68 of conveying arms 66 to grip each of the plastic bag blanks on table 1, as shown in FIG. VII. Consequently, movement of the conveying means 3 longitudinally to table 1 in the direction of sealing means 11 and 11a serves to transfer each plastic bag blank approximately one-third of the length of table 1, placing the open ends of the plastic bag blank 2 directly under end sealing means 11 and 11a where sealing of both open ends of the bag blank 2 is accomplished. Simultaneously, with this latter operation, a new plastic bag blank is placed at the opposite, now vacant, end of table 1. Shortly thereafter, the vacuum applied to the suction cups 68 of conveying arms 66 is released and the conveying means 3 is returned to its former position, the cycle described above is then repeated.

Sealing means 11 and 11a can be separate electrical heating elements mounted in suitable holders which are pressed against the edges of the open end of bag blank 2 as shown in FIG. II or can be varied to include stitching, gluing, taping or other conventional sealing means.

The feature enabling the present invention to be carried out is that at least a corner of the plastic bag blank is opened and then folded inwardly, the strip or strips of material forming the valve being then applied to within the inner edge of the inwardly folded corner and sealed thereto by a heating element defining a profile within the inwardly folded corner and valve forming members.

A special feature of this sealing operation is that the member which transfers the valve forming members or thermoplastic sheet material into position carries a U-shaped heating element thereon. This heating element extends along the upper and lower surfaces of the member in its direction of movement. When in its forward position, the plies of the bag and valve forming material are pressed against the surfaces of the member to contact the heating element and effectively form the seal.

The planar support means and conveying means include, within their scope, other common methods suitable for positioning and transferring plastic bag blanks such as conveyor belts, conveyor rolls, turntables and the like while the cutting member could assume a wide variety of cutting instruments and can serve to sever the thermoplastic sheets before or after insertion of said sheets between the separated interior surfaces of the plastic bag blank.

In brief, a plastic bag is produced by the apparatus of the present invention from a plastic bag blank, i.e., a flattened tube of flexible thermoplastic sheet material, whereby a corner sleeved valve is expeditiously formed and the bag completed by having its upper and lower ends transversely sealed.

The plastic bag illustrated in the figures of the drawing has two valve forming members of thin flexible thermoplastic sheet material. One only of these members may be used, however, if desired. Also the length of the valve member or members may be widely varied dependent on the particular service for which the bag is intended. In all cases the valve forming material is extremely flexible and generally much thinner than the material of which the bag is formed so that a self-closing action of the valve is obtained.

The valved bags produced by the apparatus of the present invention ordinarily will have a substantial volumetric capacity, e.g., at least one cubic foot, and are generally designed to carry about 50 to 100 pounds of such common pulverulent materials as cement, flour, fertilizer, carbon black, chemicals and the like. The bags are readily filled with such pulverent materials by inserting a suitable feed nozzle, spout or similar device into the valve sleeve. Closure of the valve after filling is effected by the contained materials pressing the internal sleeve against the inner wall of the bag. The walls of the bag ordinarily will have a thickness of the order of 5–10 mils, although obviously the walls may be either thinner or thicker as indicated by the use to which the bags are to be put. The valve sleeves ordinarily will be considerably thinner than the walls of the bag and usually such sleeves will be fabricated from such heat-sealable plastic materials as polyethylene, polyethylene terephthalate, polyvinyl chloride, polyvinyl acetate, polyvinylidene chloride, polypropylene and the like. The apparatus of the present invention will produce plastic bags at a high production rate having expeditiously formed and tightly sealed valve sleeve members capable of withstanding the material handling operations to which these bags will be exposed.

The above descriptions and particularly the drawings are set forth for purposes of illustration only. Many variations and modifications thereof will be obvious to those skilled in the art and can be made without departing from the spirit and scope of the invention herein described.

What is claimed is:

1. In an apparatus designed to provide a sleeve-valve constituted of flexible thermoplastic sheet material in thermally sealed relationship at a corner of a bag blank constituting a flattened tube of flexible thermoplastic sheet material, the combination comprising planar support means for said blank, a conveying means for positioning said blank on said support, holding means for securing said blank on said support, a clamping means for separating the interior surfaces of said blank at least at a corner thereof, a corner folding member in substantially longitudinal planar relationship and pivotally actionable relative to said planar support, a threading means reciprocally actionable in lateral planar relationship to said planar support for inserting a sheet of flexible thermoplastic material in folded relationship relative to itself between the separated interior surfaces of said blank and in part laterally overlaying the leading edge of a corner of the blank sheet which becomes inverted by action of the said corner folding member, said threading means being provided with a heating element defining a profile and capable of longitudinal positioning corresponding at least in part to that part of the said sheet which overlays the inverted corner of said blank.

2. The apparatus according to claim 1 wherein the clamping means is provided with a plurality of vacuum cups, pairs of which are presented each at opposite exterior surfaces of said blank and in slightly offset position relative to one another.

3. The apparatus according to claim 1 wherein the corner folding member is capable of longitudinal and pivotal action relative to said planar support.

4. The apparatus according to claim 1 wherein the heating element provided on said threading means is a U-shaped electrical resistance heater.

5. The apparatus according to claim 1 wherein the threading means is coordinated with a continuous sheet supply means and a cutting member.

6. The apparatus according to claim 5 wherein a plurality of continuous sheet supply means are coordinated with the said threading means.

7. The apparatus according to claim 1 wherein heat sealing means are provided with which to seal the open lateral ends of said bag blank.

References Cited in the file of this patent

UNITED STATES PATENTS

| 2,387,274 | Lee | Oct. 23, 1945 |
| 2,442,431 | Peters et al. | June 1, 1948 |
| 2,542,170 | Weeks | Feb. 20, 1951 |
| 2,729,148 | Peters et al. | Jan. 3, 1956 |